(No Model.)

J. FOLLMER.
FERTILIZER DISTRIBUTER.

No. 361,403. Patented Apr. 19, 1887.

WITNESSES:
C. Bendixon
N. M. Seamans

INVENTOR
Jacob Follmer
BY
Duell, Lassst Duell
ATTORNEYS

UNITED STATES PATENT OFFICE.

JACOB FOLLMER, OF SYRACUSE, NEW YORK.

FERTILIZER-DISTRIBUTER.

SPECIFICATION forming part of Letters Patent No. 361,403, dated April 19, 1887.

Application filed February 16, 1887. Serial No. 227,788. (No model.)

*To all whom it may concern:*

Be it known that I, JACOB FOLLMER, of Syracuse, in the county of Onondaga, in the State of New York, have invented new and useful Improvements in Fertilizer-Distributers, of which the following, taken in connection with the accompanying drawings, is a full, clear, and exact description.

This invention relates to devices employed in hoppers of fertilizer-distributers for the purpose of agitating or stirring and breaking up the lumps of fertilizer in the hopper, and thus facilitating the discharge of the fertilizer.

The invention consists in an improved construction and combination of the component parts of the aforesaid agitators or stirrers and their attachment to the hopper, whereby the distribution of the fertilizers is effected in a thorough manner and the danger of clogging the hopper is effectually obviated.

Figure 1:
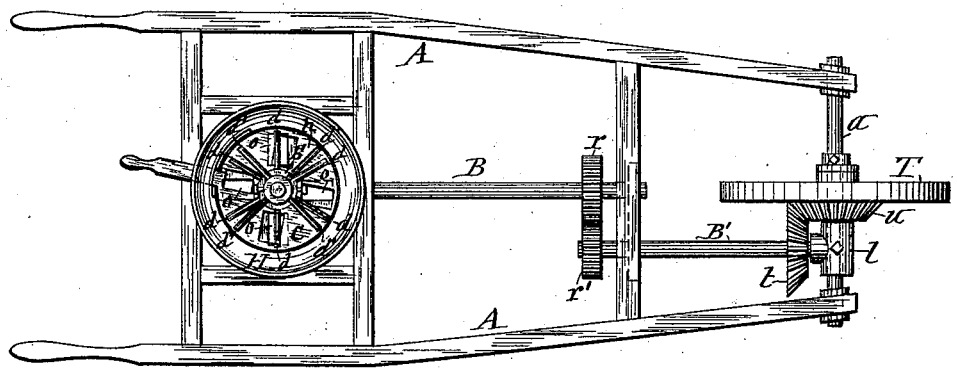
Figures 2, 3:
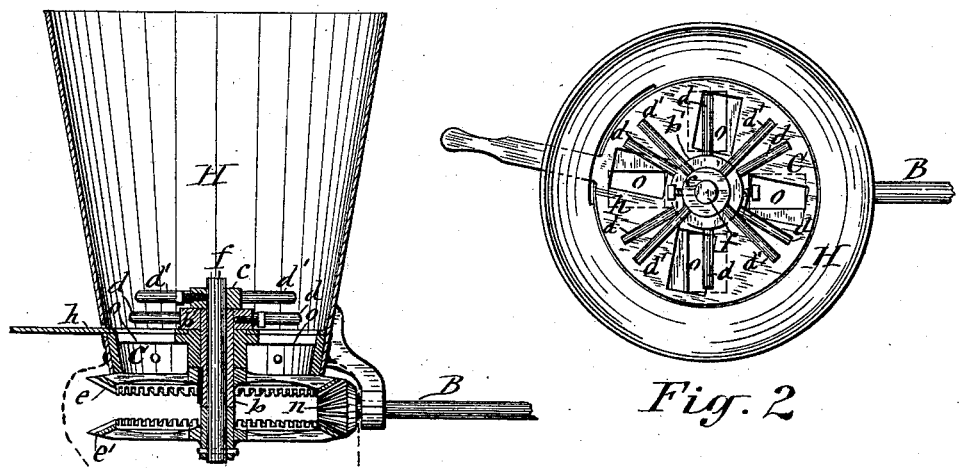

In the annexed drawings, Figure 1 is a plan view of my improved fertilizer-distributer carried on a frame mounted at one end on a single traction-wheel and adapted to be operated in the manner of a wheelbarrow. Fig. 2 is an enlarged detached top plan view of the hopper with the agitators or stirrers, and Fig. 3 is a vertical transverse section of the same.

Similar letters of reference indicate corresponding parts.

A represents the main frame, which, for the purpose of an exemplification of the means of operating the fertilizer-distributer, is represented in the form of a wheelbarrow-frame supported at its forward end on the axle $a$ of the traction-wheel T, which latter is in this case mounted loosely on the axle, so as to allow it to freely rotate thereon.

C represents a metallic annular spider secured in a horizontal position to the rear portion of the frame A, and to the exterior of the said spider is secured the base of the hopper H, preferably composed of sheet metal. The spider is provided with a central eye in which is journaled a sleeve, $b$, extending below the base of the hopper and above the top of the spider. To the lower end of said sleeve is firmly secured a beveled gear-wheel, $e$, having its toothed portion facing downward, and the inner periphery thereof of larger diameter than the discharge-opening of the hopper or the inner periphery of the spider C. To the upper end of the aforesaid sleeve is secured a hub, $b'$, from which project radially horizontal spokes $d$ $d$, and immediately under the said spokes the spider $c$ is provided with a series of openings, $o$ $o$. Upon the top of the spider is arranged, to turn, the gate $h$, which is provided with corresponding openings. By turning said gate on its axis the ports thereof can be made to coincide with the ports $o$ of the spider, to allow the fertilizer to freely escape through the same, or the solid portions of the gate can be made to cover the ports $o$ to a greater or less extent to regulate the egress of the fertilizer from the hopper.

Vertically through the sleeve $b$ is extended a shaft, $f$, which projects below the sleeve and above the upper end of the same, and has secured to its lower end a bevel-gear, $e'$, which has its toothed portion facing upward, and is of the same diameter as the gear-wheel $e$.

To the upper end of the shaft $f$ is rigidly secured a hub, $c$, from which project radially spokes $d'$. Between the two gears $e$ $e'$, and meshing therewith, is a bevel-pinion, $n$, which is rigidly secured to the shaft B, which shaft is extended toward the traction-wheel T, and at right angles to the axle $a$. The shaft B terminates some distance back of the traction-wheel, and is journaled in a suitable box secured to the frame A. To the forward end of the shaft B is rigidly secured a pinion, $r$, which meshes in a pinion, $r'$, secured to the rear end of a counter-shaft, B', which is arranged parallel with the shaft B, and has its rear end journaled in a box secured to the frame A, and its forward end journaled in a box, $l$, secured to the axle $a$. To the forward end of the shaft B' is secured a miter-gear, $t$, which meshes in a miter-pinion, $u$, which is rigidly secured to the traction-wheel T.

The aforesaid shafts B B', with the gears attached thereto, serve to transmit rotary motion from the traction-wheel to the bevel-gears $e$ $e'$, which latter are caused to turn in opposite directions from each other, and consequently the hubs $b'$ $c$ are likewise turned in opposite directions, and thereby cause the fertilizer in the hopper to be thoroughly stirred or agitated and broken up, so as to facilitate its escape through the ports $o$ $o$. The gear-wheels $e$ $e'$, being of greater diameters than the discharge-opening of the hopper, effectually obviate the danger of clogging of said wheels by the fertilizer dropping on the toothed portions thereof.

Having described my invention, what I claim as new, and desire to secure by Letters Patent, is—

1. In a fertilizer-distributer, the combination, with the frame and traction-wheel, of a hopper supported on said frame, a vertical shaft in the center of the hopper and extending below the hopper, a bevel gear-wheel secured to the lower end of said shaft and having its toothed portion facing upward and the inner periphery thereof of a greater diameter than the discharge-opening of the hopper, a sleeve on said shaft above the bevel gear-wheel, a corresponding gear-wheel secured reverse to the aforesaid sleeve, hubs secured to the said shaft and sleeve in the lower portion of the hopper, spokes projecting horizontally from said hubs, a horizontal shaft journaled on the frame at right angles to the aforesaid vertical shaft and having one end terminating midway between the aforesaid bevel gear-wheels, a bevel-pinion on the horizontal shaft, meshing in said gear-wheels, and gears arranged to transmit motion from the traction-wheel to the aforesaid horizontal shaft, substantially as described and shown.

2. In combination with the main frame A and shaft B, the annular spider C, provided with ports $o$ $o$, the hopper H, secured at its base to the exterior of the spider, the sleeve $b$, journaled in the center of the spider and extending below the hopper, the hub $b'$, secured to the sleeve immediately above the spider and provided with spokes $d$ $d$, the bevel gear-wheel $e$, secured to the sleeve below the hopper and having the inner periphery of its toothed portion of a greater diameter than the inner periphery of the spider, the shaft $f$, journaled in the sleeve and projecting at opposite ends thereof, the hub $c$, secured to the upper end of said shaft and provided with spokes $d'$ $d'$, the bevel gear-wheel $e'$, secured to the lower end of the said shaft, and the bevel-pinion $n$, attached to the shaft B and meshing in the gear-wheels $e$ $e'$, all constructed and combined substantially in the manner specified and shown.

In testimony whereof I have hereunto signed my name and affixed my seal, in the presence of two attesting witnesses, at Syracuse, in the county of Onondaga, in the State of New York, this 14th day of February, 1887.

JACOB FOLLMER. [L. S.]

Witnesses:
C. BENDIXON,
H. P. DENISON.